(No Model.)

E. D. NEWTON.
THERMO RESERVOIR.

No. 299,252. Patented May 27, 1884.

WITNESSES:
Gustave Dieterich
Fred Heuetwohl

INVENTOR
Edwin D. Newton

UNITED STATES PATENT OFFICE.

EDWIN D. NEWTON, OF NEW YORK, N. Y.

THERMO-RESERVOIR.

SPECIFICATION forming part of Letters Patent No. 299,252, dated May 27, 1884.

Application filed June 25, 1883. (No model.)

*To all whom it may concern:*

Be it known that I, EDWIN D. NEWTON, of the city, county, and State of New York, have invented a new and Improved Thermo-Reservoir, of which the following is a full, clear, and exact description.

The object of my invention is to provide a new and improved apparatus for the introduction and retention of heat, and for charging non-sedimentary mineral waters with heat under the boiling-point of water by absorption, said mineral waters being contained in a coil of flattened pipe lined with glass or other innocuous material. The non-sedimentary mineral waters thus charged with heat are either natural thermal, natural non-thermal, or artificial. The heat used in heating said mineral waters may be obtained from hot water, as shown by my specification and drawings, or from hot aqueous vapor or hot air.

The invention consists in a vessel adapted to contain hot water, and a coil extending downward from an upper vessel, which coil is provided at its lower end with a cock projecting from the hot-water vessel. Mineral water is stored in the upper vessel, and by passing through the coil it is heated by absorption. The heating water is heated in a separate vessel, and is conducted into the vessel containing the coil by a suitable pipe.

Reference is to be had to the accompanying drawings, forming part of this specification, in which similar letters of reference indicate corresponding parts in both the figures.

Figure 1:
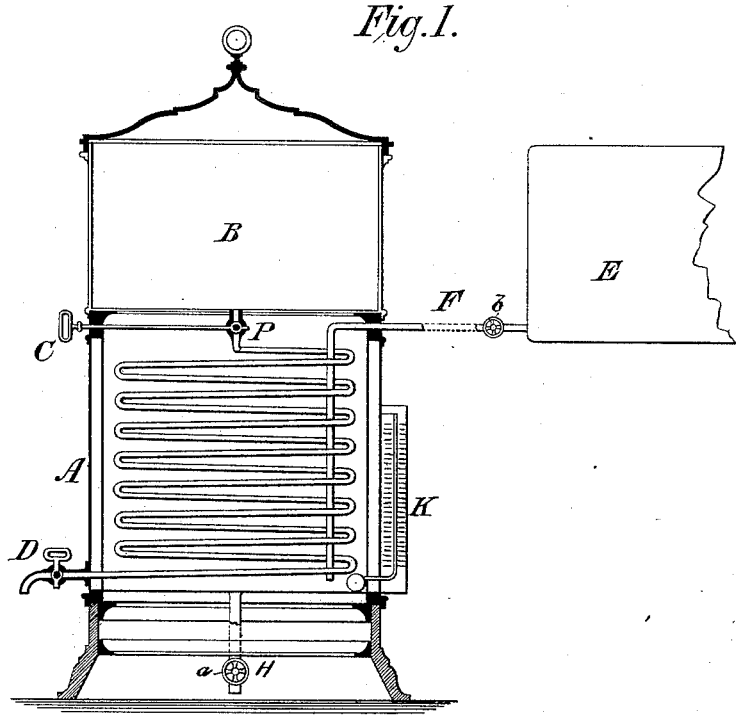
Figure 2:
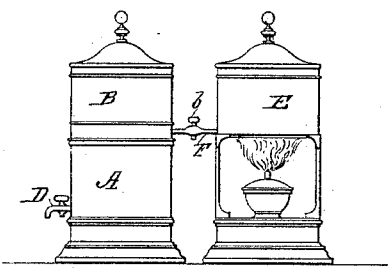

Figure 1 is a longitudinal sectional elevation of my improved thermo-reservoir. Fig. 2 is a side view of the same on a smaller scale.

A vessel, A, is provided with double walls, the space between which can be filled with a non-conductor of heat or remain empty.

On the vessel A a tank or vessel, B, rests, which is provided with a suitable cover.

From the bottom of the vessel B a flattened coiled pipe, P, lined with glass or other innocuous material, extends through and to the bottom of the vessel A, and is provided at its lower end with an outwardly-projecting faucet or cock. The coil is provided at its upper end with a cock, which can be operated by a rod, C, projecting from the casing. A vessel, E, is placed higher than the vessel A, and from the bottom of said vessel E a pipe extends to the bottom of the vessel A. The vessel A is provided with a bottom outlet-pipe, H, provided with a stop-cock, a, for drawing off the water in the vessel A when desired, and with a thermometer, K, the bulb of which is within the vessel A. The vessel E is provided with suitable supports, so that a lamp, burner, or furnace can be placed under said vessel E to heat the water in the same. The hot water flows from the vessel E through pipe F, provided with a stop-cock, b, to regulate the flow of hot water into the vessel A, and fills the same. The mineral water in the vessel B must pass through the coil P to reach the cock D, and in doing so the said mineral water is highly charged with heat to any desired degree under the boiling-point of water. By the use of the thermo-reservoir these non-sedimentary mineral waters are quickly charged with heat, and acquire at the same time a uniform temperature. These two most desirable effects are due to the peculiar flat shape of the coil. The opposite flat sides of this pipe being in close proximity provides thereby, for a given quantity of mineral water flowing through said pipe, as large a surface as possible for the absorption of heat from the surrounding hot water. Natural heat and artificial heat being identical, both as to their chemical nature and effect upon the human system, said mineral waters charged with heat by absorption may be administered internally at a high temperature, and utilized for therapeutic, hygienic, and dietetic purposes, the same as naturally-heated waters. In charging these mineral waters with heat by absorption no sedimentation is produced, the carbonic-acid gas which holds some ingredient or ingredients of the same in solution being undisturbed, and the chemical character of their mineral contents remaining unchanged. Of the non-sedimentary mineral waters thus highly charged with heat, the natural thermal of high temperature have thereby their therapeutic virtues fully restored, and the natural thermal of low temperature, the natural non-thermal, and the artificial have their curative properties very greatly increased. By means of the thermo-reservoir these mineral waters may be charged with heat and used for bathing. The number of coils of pipe in a thermo-reservoir may be increased in accordance with the variety of the mineral waters utilized. Even sedimentary mineral waters—as those impregnated with iron and its carbonates—may be charged with heat and their therapeutic virtues greatly increased by placing a lined pipe in the mouth of the spring and connecting same with the coil of the thermo-reservoir. These waters, however, should be utilized immediately after the same are drawn from the thermo-reservoir.

Having thus described my invention, what I claim as new, and desire to secure by Letters Patent, is—

1. The combination, with a vessel, A, adapted to receive and contain hot water, of the vessel B, having a coil, P, extending through the vessel A, substantially as herein shown and described.

2. The combination, with a vessel, A, adapted to receive and contain hot water, of the vessel B, provided with a coil, P, extending through vessel A, the vessel E, and the pipe F, extending from the bottom of the vessel E to the bottom of the vessel A, substantially as herein shown and described.

3. The combination, with the vessel A, the vessel B, and the coil P, extending through vessel A, of the vessel E, pipe F, outlet-pipe H, and thermometer K, substantially as shown and described.

EDWIN D. NEWTON.

Witnesses:
A. G. SINCLAIR,
W. H. SELDEN.